United States Patent
Heise et al.

(10) Patent No.: US 8,400,289 B2
(45) Date of Patent: Mar. 19, 2013

(54) TIRE PRESSURE MONITORING SYSTEM AND METHOD FOR THE ALLOCATION OF TIRE MODULES IN A TIRE PRESSURE MONITORING SYSTEM

(75) Inventors: Andreas Heise, Erzhausen (DE); Jens Bachon, Niedernhausen (DE); Stefan Kammann, Kelkheim (DE); Ralf Hartmann, Kriftel (DE); Wolfgang Erler, Taunusstein (DE); Markus Neumann, Mannheim (DE); Marco Bös, Wächtersbach (DE); Peter Säger, Friedrichsdorf (DE)

(73) Assignee: Continental Teves AG & Co, OHG, Frankfurt (DE)

( * ) Notice: Subject to any disclaimer, the term of this patent is extended or adjusted under 35 U.S.C. 154(b) by 324 days.

(21) Appl. No.: 11/887,555

(22) PCT Filed: Mar. 23, 2006

(86) PCT No.: PCT/EP2006/060992
§ 371 (c)(1),
(2), (4) Date: Apr. 28, 2008

(87) PCT Pub. No.: WO2006/103195
PCT Pub. Date: Oct. 5, 2006

(65) Prior Publication Data
US 2009/0021363 A1    Jan. 22, 2009

(30) Foreign Application Priority Data

Apr. 1, 2005 (DE) .......................... 10 2005 015 299
Mar. 18, 2006 (DE) .......................... 10 2006 012 535

(51) Int. Cl.
*B60C 23/00*    (2006.01)
*B60C 23/02*    (2006.01)

(52) U.S. Cl. ..... 340/447; 340/445; 340/448; 340/13.25; 340/13.26; 340/10.3; 340/10.41

(58) Field of Classification Search .......... 340/442–448, 340/505, 13.25, 13.26, 10.3, 10.41; 73/146.2–146.6
See application file for complete search history.

(56) References Cited

U.S. PATENT DOCUMENTS

| | | | | |
|---|---|---|---|---|
| 3,496,455 A | * | 2/1970 | Gouilloud | 324/339 |
| 4,221,128 A | * | 9/1980 | Lawson et al. | 73/861.29 |
| 4,360,740 A | * | 11/1982 | Conard | 307/134 |
| 4,749,993 A | * | 6/1988 | Szabo et al. | 340/870.31 |
| 5,264,733 A | * | 11/1993 | Tigges | 307/116 |

(Continued)

FOREIGN PATENT DOCUMENTS

| | | |
|---|---|---|
| DE | 19915999 | 10/2000 |
| DE | 19938431 | 2/2001 |

(Continued)

*Primary Examiner* — Daniel Wu
*Assistant Examiner* — Son M Tang (57) ABSTRACT

Disclosed is a tire pressure monitoring system for motor vehicles, including a central unit (2, 7) with at least one trigger module (4), which is integrated into the central unit or connects through control lines (3) to the central unit, and with at least one tire module (6) arranged in a vehicle wheel (5), with the tire module being in communication with the central unit and the trigger module by means of wireless transmission technology, and with the tire pressure monitoring system including fewer trigger modules than tire modules.

20 Claims, 5 Drawing Sheets

U.S. PATENT DOCUMENTS

| | | | | |
|---|---|---|---|---|
| 5,602,524 | A * | 2/1997 | Mock et al. | 340/447 |
| 5,689,238 | A * | 11/1997 | Cannon et al. | 340/572.1 |
| 5,880,363 | A * | 3/1999 | Meyer et al. | 73/146.5 |
| 6,278,363 | B1 * | 8/2001 | Bezek et al. | 340/442 |
| 6,489,888 | B1 * | 12/2002 | Honeck et al. | 340/442 |
| 6,580,365 | B2 * | 6/2003 | Starkey | 340/447 |
| 6,681,164 | B2 * | 1/2004 | Bergerhoff et al. | 701/36 |
| 6,696,935 | B2 * | 2/2004 | Bonardi et al. | 340/447 |
| 6,710,708 | B2 * | 3/2004 | McClelland et al. | 340/442 |
| 6,788,193 | B2 * | 9/2004 | King et al. | 340/447 |
| 6,828,905 | B2 * | 12/2004 | Normann et al. | 340/447 |
| 6,871,157 | B2 * | 3/2005 | Lefaure | 702/150 |
| 6,879,252 | B2 * | 4/2005 | DeZorzi et al. | 340/505 |
| 6,885,292 | B2 * | 4/2005 | Katou | 340/445 |
| 6,888,446 | B2 * | 5/2005 | Nantz et al. | 340/433 |
| 6,897,770 | B2 * | 5/2005 | Lill | 340/445 |
| 6,950,008 | B2 * | 9/2005 | Hagl et al. | 340/5.61 |
| 6,963,274 | B2 * | 11/2005 | Saheki et al. | 340/447 |
| 6,972,671 | B2 * | 12/2005 | Normann et al. | 340/442 |
| 7,010,968 | B2 * | 3/2006 | Stewart et al. | 73/146 |
| 7,177,739 | B2 * | 2/2007 | Kuchler | 701/29 |
| 7,362,218 | B2 * | 4/2008 | McCall et al. | 340/447 |
| 7,411,488 | B2 * | 8/2008 | Watabe et al. | 340/442 |
| 7,414,521 | B2 * | 8/2008 | Jost | 340/442 |
| 7,425,892 | B2 * | 9/2008 | Mori et al. | 340/442 |
| 7,482,921 | B2 * | 1/2009 | Froitzheim et al. | 340/539.21 |
| 7,515,040 | B2 * | 4/2009 | Mori et al. | 340/442 |
| 7,518,495 | B2 * | 4/2009 | Tang et al. | 340/445 |
| 2003/0227379 | A1 | 12/2003 | Itou | |
| 2005/0253696 | A1 * | 11/2005 | Mori et al. | 340/445 |
| 2006/0022813 | A1 * | 2/2006 | Schulze et al. | 340/442 |

FOREIGN PATENT DOCUMENTS

| | | |
|---|---|---|
| DE | 10324083 | 9/2004 |
| EP | 0806307 | 1/2001 |
| EP | 1211104 | 6/2002 |
| EP | 1419908 | 5/2004 |
| EP | 1452349 | 9/2004 |
| WO | 2005018963 | 3/2005 |

* cited by examiner

TIRE PRESSURE MONITORING SYSTEM AND METHOD FOR THE ALLOCATION OF TIRE MODULES IN A TIRE PRESSURE MONITORING SYSTEM

This application is the U.S. national phase of international application PCT/EP2006/060992 filed Mar. 23, 2006, which designated the U.S. and which claims the benefit of priority of German Patent Application Number 10 2006 012 535.5 filed Mar. 18, 2006 and German Patent Appliction Number 10 2005 012 299.6 filed Apr. 1, 2005. The contents of each of the aforementioned documents are incorporated herein in their entirety.

BACKGROUND OF THE INVENTION

The present invention relates to a tire pressure monitoring system including a central unit (2, 7) with at least one trigger module (4), which is integrated into the central unit or connects through control lines (3) to the central unit, and with at least one tire module (6) arranged in a vehicle wheel (5), with the tire module being in communication with the central unit and the trigger module by means of wireless transmission technology. The tire pressure monitoring system includes fewer trigger modules than tire modules. Also, a method for the allocation of tire modules in a tire pressure monitoring system in motor vehicles, with the tire pressure monitoring system including a central unit (2, 7) with at least one trigger module (4), which is integrated into the central unit or connects through control lines (3) to the central unit, and respectively one tire module (6) per vehicle wheel (5), with the tire module being in communication with the central unit and the trigger module by means of a wireless transmission technology, wherein at least one trigger module is in communication with more than one tire module in a wireless fashion.

It is of great significance to vehicle safety to reliably monitor the tire inflation pressure on all wheels of a motor vehicle or a motorcycle. There are different approaches how to realize tire pressure monitoring systems. In the so-called directly measuring tire pressure monitoring systems, the tire inflation pressure is measured directly in the tires and is sent to an electronic evaluation unit by means of transmitting and receiving devices. A directly measuring tire pressure monitoring system of this type is e.g. described in DE 199 38 431 C2 or in DE 199 15 999 C2. Usually, the tire pressure is sensed by means of a battery-powered pressure module and is sent by radio transmission to one or more receiving modules. EP 0 806 307 B1, for example, discloses a method for implementing the allocation of the wheel position to inflation pressure checking devices in an inflation pressure checking system of a motor vehicle.

The publication DE 196 32 150 B4 describes a method of checking the inflation pressure in the tires of motor vehicle wheels. Herein, a long-wave signal is used to excite exactly one wheel electronic unit to send out a data telegram with a special identification signal, and the special identification signal is generated by a checking unit in the wheel electronic unit based on the received long-wave signal. By successive excitation of all wheel positions, the identification codes of the allocated wheel electronic units are sensed. In this arrangement, a wheel electronic unit is positioned in or at each tire, and allocated to each wheel electronic unit is a long-wave unit, which is located close by the corresponding wheel.

An object of the invention involves providing a low-cost tire pressure monitoring system, which enables a reliable allocation of tire modules to defined wheel or axle positions.

SUMMARY OF THE INVENTION

According to the invention, this object is achieved by the tire pressure monitoring system including a central unit (2, 7) with at least one trigger module (4), which is integrated into the central unit or connects through control lines (3) to the central unit, and with at least one tire module (6) arranged in a vehicle wheel (5), with the tire module being in communication with the central unit and the trigger module by means of wireless transmission technology. The tire pressure monitoring system includes fewer trigger modules than tire modules.

According to the invention, the term 'tire module' implies a device for sensing tire information such as tire inflation pressure, tire temperature, etc., which includes, among others, a transmitting and receiving device for the exchange of control and data signals. This tire module can be arranged at the wheel hub or the tire of a motor vehicle wheel.

The term 'identification number' or 'universal ID' relates to an identification code each tire module has. This identification code can be identical for all tire modules, for example, or different identification numbers are assigned to different types of tire modules, or each tire module has a different identification number, e.g. a consecutive number. The purpose of the identification number is to ensure that only those tire modules are learnt, which actually belong to this tire pressure monitoring system.

The idea underlying the invention is that the tire pressure monitoring system includes fewer trigger modules than tire modules. As a result, the costs of manufacture for the tire pressure monitoring system can be reduced. More than one tire module is allocated to at least one trigger module.

Each vehicle wheel comprises one tire module in a preferred embodiment of the tire pressure monitoring system of the invention.

In another preferred embodiment, the at least one tire module, especially preferred each tire module, includes at least one device for sensing the signal strength of a trigger signal received from the trigger module(s), and the tire module transmits the respectively sensed signal strength of the trigger signal to the central unit. An allocation of the tire modules to the wheel positions is performed using an analysis of the signal strength of the trigger signals received by the tire modules. This is applicable especially when the tire modules are placed at different distances from the trigger module(s).

In another preferred embodiment, the at least one trigger module, especially preferred each trigger module, includes at least one device for changing the signal strength of the trigger signal in order to be able to trigger the tire modules with at least two different signal strengths of the trigger signal. An allocation of the tire modules to the wheel positions is possible when the two or more tire modules allocated to a trigger module are fitted at different distances from the trigger module, since only the tire module lying next can be reached with an appropriate selection of the distances and signal strengths, e.g. at a low signal strength of the trigger signal.

It is likewise preferred that at least one tire module comprises a device for sensing the direction of rotation of the tire.

The different embodiments for the allocation of the tire modules to the wheel positions are combined in a particularly preferred fashion in order to allow a particularly reliable allocation.

In a preferred embodiment of the tire pressure monitoring system according to the invention, a trigger module comprises an oscillatory circuit, which is commutable by means of a switch, in particular an electronic switch, from a transmitting arrangement, composed of a capacitor and a transmitting coil, to a non-transmitting arrangement, composed of the capacitor and a non-transmitting coil. This allows a modulation of the signal radiated from the oscillatory circuit, without interrupting the oscillation of the oscillatory circuit.

The invention also relates to a method for the allocation of tire modules in a tire pressure monitoring system for a motor vehicle.

Further preferred embodiments of the tire pressure monitoring system of the invention and the method of the invention can be taken from the sub claims and the following description of embodiments by way of Figures.

DETAILED DESCRIPTION OF THE DRAWINGS

Figure 1:
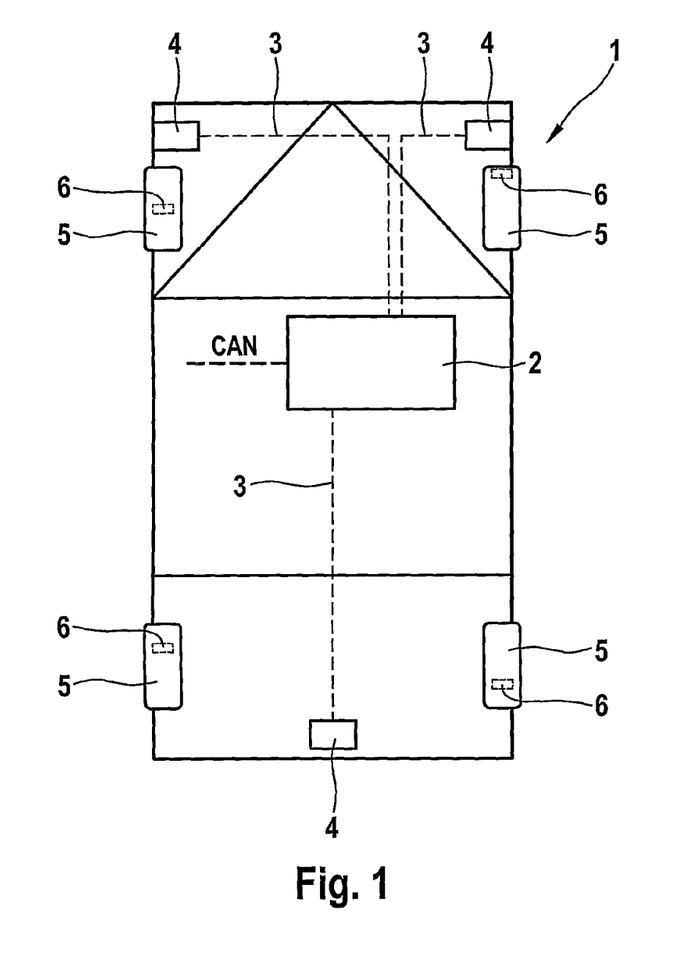
FIG. 1 is a first embodiment of a tire pressure monitoring system.

FIG. 1 illustrates a first embodiment of a tire pressure monitoring system. A central unit (receiver) 2 with a connection to a vehicle data bus (CAN) is arranged in a motor vehicle 1. The central unit 2 is in connection to three trigger modules 4 via control lines 3. Two of these trigger modules 4 are arranged close to a vehicle wheel 5 of the front axle, while the third trigger module 4 is arranged at the rear axle. Upon request of the central unit 2, the trigger modules 4 send an order to the tire modules 6 placed in the vehicle wheels 5. The tire modules 6 execute this order (e.g. store data or send telegram). When a telegram has been requested, the tire modules send data (e.g. tire information such as tire pressure, tire temperature, date of manufacture of the tire, etc.) to the central unit 2. The trigger modules drive the tire modules 6 at a low frequency, especially with 125 kilohertz. In contrast thereto, the data transmission from the tire module 6 to the central unit 2 takes place in the high-frequency range, especially in the released ISM frequencies (e.g. 13.56 megahertz, 315 megahertz, 433.92 megahertz, 868 megahertz, 2.45 gigahertz).

Figure 2:
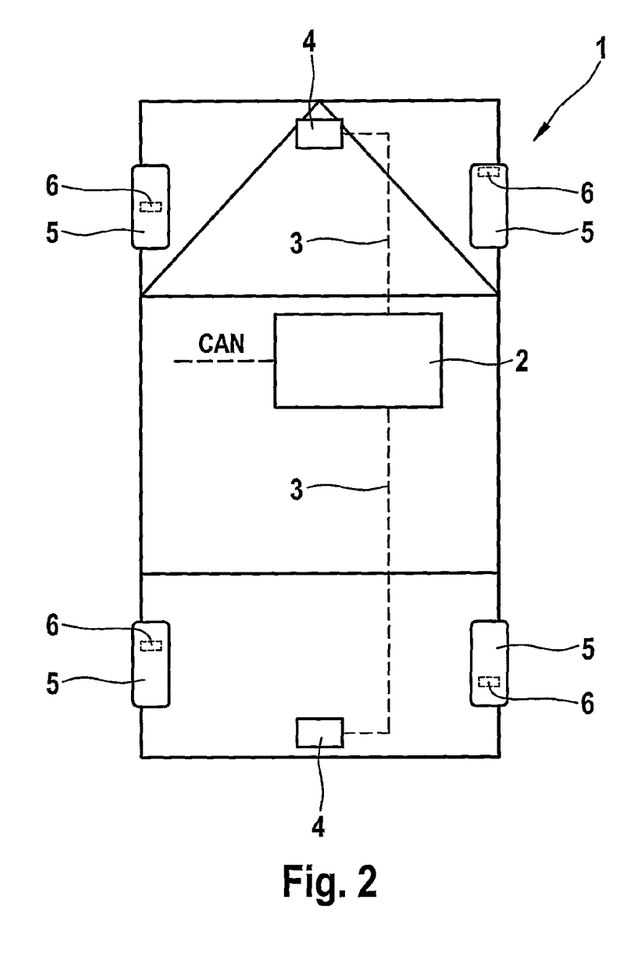
FIG. 2 is a second embodiment of a tire pressure monitoring system.

FIG. 2 illustrates a second embodiment of a tire pressure monitoring system. Like in FIG. 1, the motor vehicle 1 also includes a central unit (receiver) 2 with a connection to a vehicle data bus (e.g. CAN). The central unit 2 is in connection to two trigger modules 4 by way of control lines 3, and the trigger modules 4, again upon the request of the central unit 2, send an order to the tire modules 6 disposed in the vehicle wheels 5. In this arrangement, one trigger module is allocated to the front axle, while the other trigger module is allocated to the rear axle of the vehicle.

Figure 3:
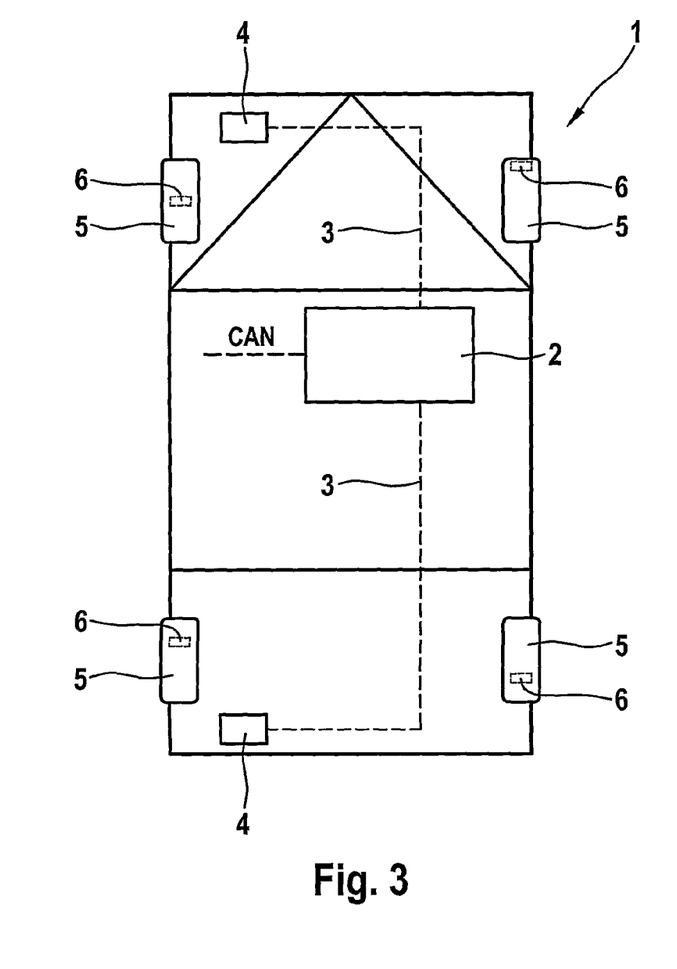
FIG. 3 is a third embodiment of a tire pressure monitoring system.

FIG. 3 depicts a third embodiment of a tire pressure monitoring system. Apart from the asymmetrical arrangement of the trigger modules 4, the design corresponds to the design according to the second embodiment. The trigger modules can be displaced towards one side (for example, both towards the left vehicle side) or diagonally (e.g. the trigger module of the front axle towards the left vehicle side, and the trigger module of the rear axle towards the right vehicle side).

Figure 4:
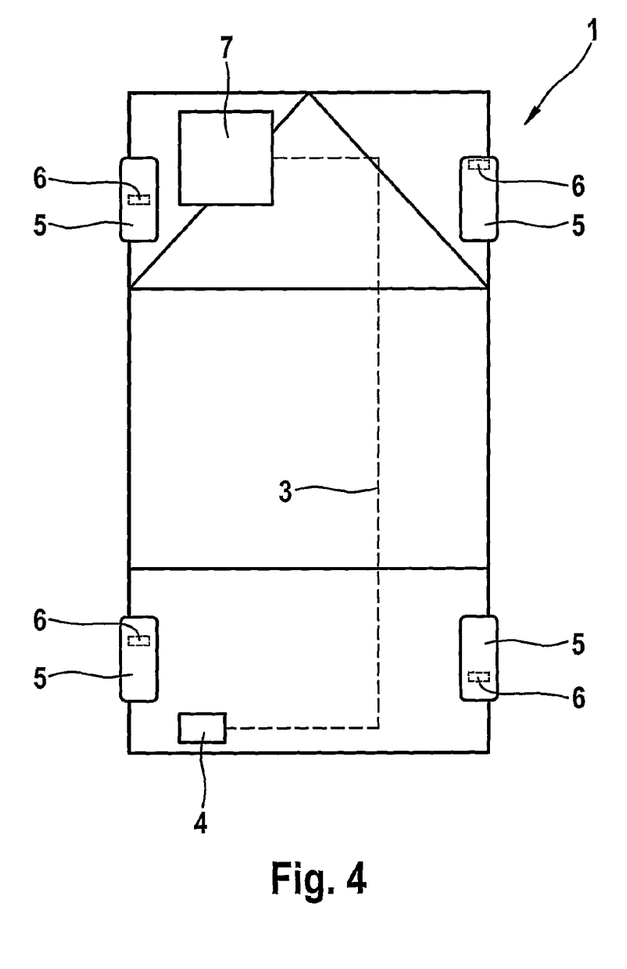
FIG. 4 is a fourth embodiment of a tire pressure monitoring system.

FIG. 4 represents a fourth embodiment of a tire pressure monitoring system. In contrast to the second and third embodiment, an integrated central unit 7 is employed herein, which comprises a central unit 2 known from FIGS. 1 to 3 and a trigger module. The arrangement of the integrated central unit 7 corresponds to the arrangement according to the second or third embodiment (integrated central unit is assigned symmetrically or asymmetrically to a vehicle axle).

Figure 5:
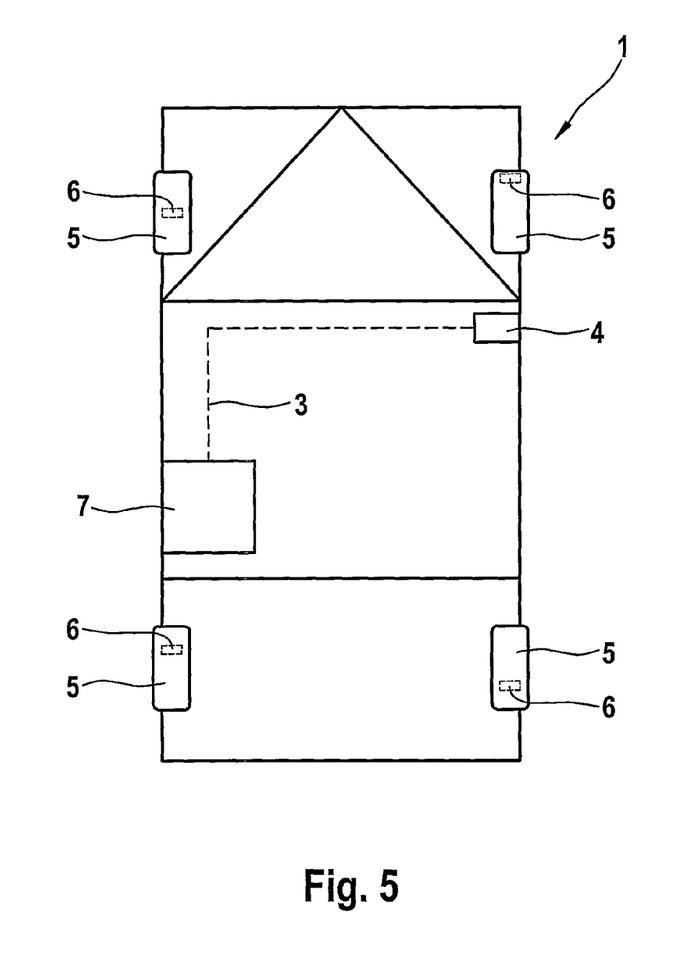
FIG. 5 is a fifth embodiment of a tire pressure monitoring system.

FIG. 5 shows a fifth embodiment of a tire pressure monitoring system. The design is similar to the design of the fourth embodiment, and the integrated central unit 7 is arranged herein at one vehicle side, while a trigger module 4 is arranged at the other vehicle side. The integrated central unit 7 and the trigger module 4 can also be arranged more closely in the direction of a vehicle axle (e.g. integrated central unit is nearer to the rear axle; trigger module is nearer to the front axle).

Figure 6:
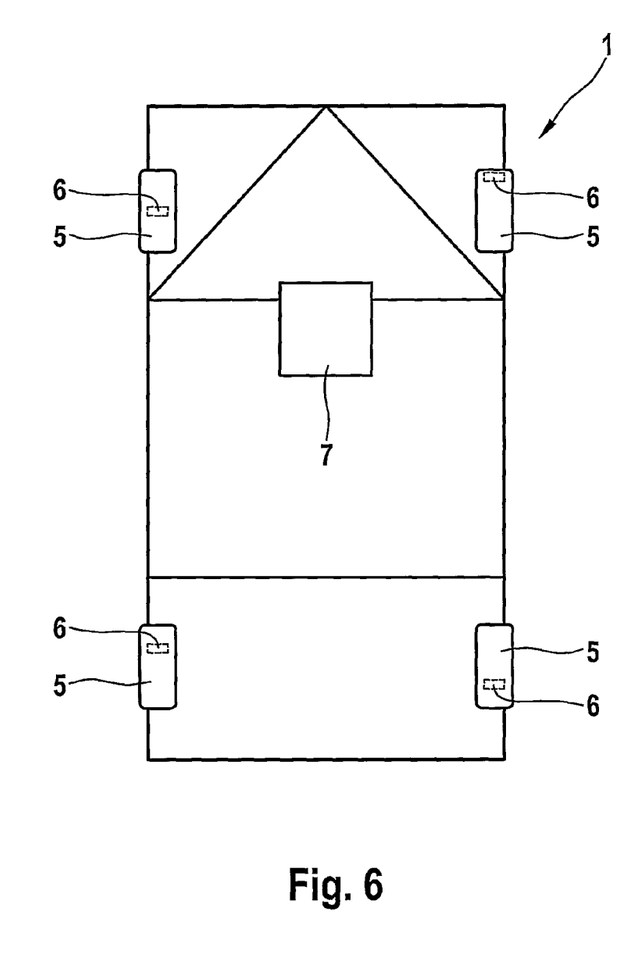
FIG. 6 is a sixth embodiment of a tire pressure monitoring system.

FIG. 6 represents a sixth embodiment of a tire pressure monitoring system. Only one integrated central unit 7 without further trigger modules is used, what is in contrast to the previous embodiments. The integrated central unit 7 is arranged either more closely to the front axle, or more closely to the rear axle. Furthermore, the central unit 7 can also be arranged additionally in more proximity to one vehicle side (asymmetrical arrangement).

Of course, combinations of the previously described embodiments are also feasible. As an example, an embodiment with three trigger modules, e.g. two trigger modules at the front axle (as shown in FIG. 1) and an offset trigger module at the rear axle (as shown in FIG. 3) are possible herein.

Figure 7A:
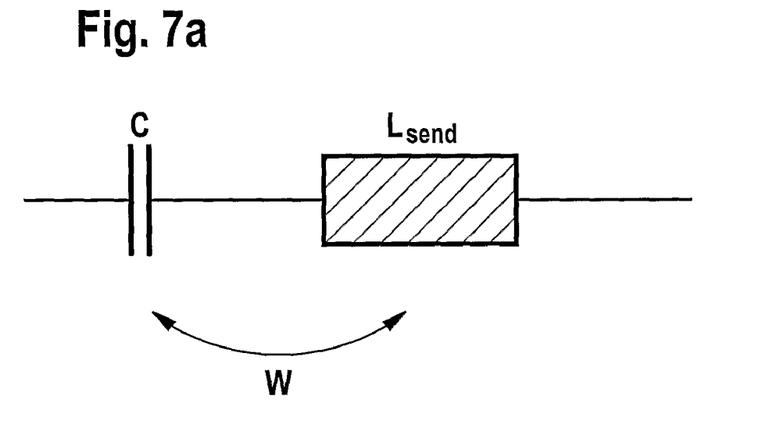
FIG. 7 shows two oscillatory circuit arrangements.

FIG. 7 illustrates two oscillatory circuit arrangements. FIG. 7a) shows a prior art oscillatory circuit arrangement composed of a capacitor C and a transmitting coil $L_{transmit}$, in which energy W is stored alternatingly. An arrangement of this type has previously been used for the data transfer from the trigger modules 4 to the tire modules 6 (FIGS. 1 to 6) in the trigger modules 4. For example, data transfer takes place by means of an amplitude modulation (ASK) with a frequency of 125 kilohertz. For the data transfer from the trigger module 4 to the tire module 6, the carrier frequency (125 kilohertz) is amplitude modulated (switch-on and off) with a variable frequency. After each switching-on or switching-off operation, a transient period of the oscillatory circuit is necessary, in which the efficiency of the arrangement is low.

Figure 7B:
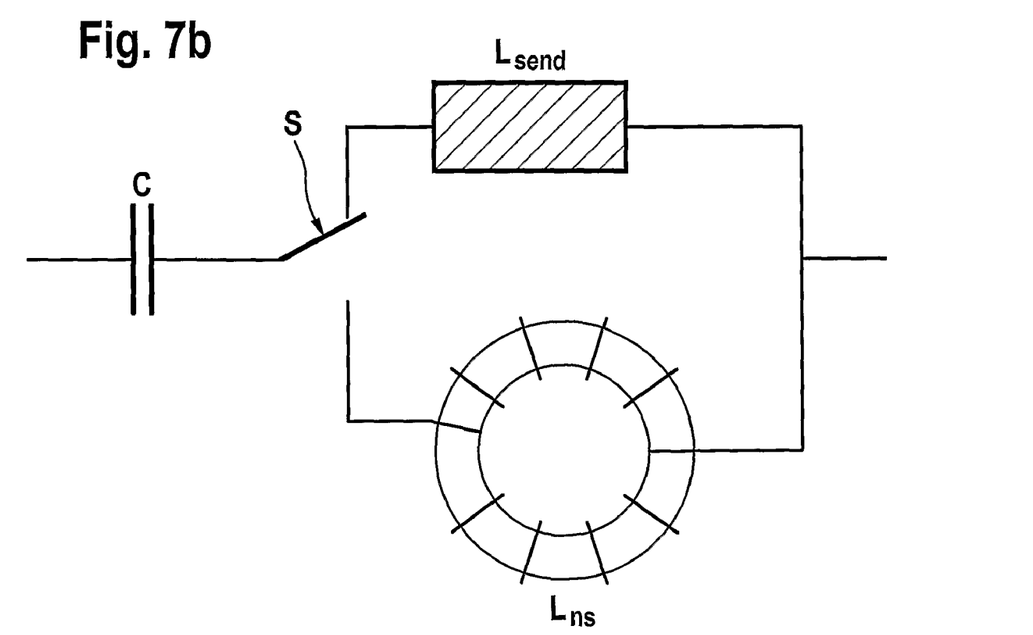

In order to reduce the start-up time and switch-off time of the oscillatory circuit (transmitting power), FIG. 7b) illustrates a second oscillatory circuit, which includes another, a non-transmitting coil $L_{nt}$ (for example, a single-aperture core) in addition to the capacitor C and the transmitting coil $L_{transmit}$. By way of a switch S (preferably an electronic switch), either a first oscillatory circuit, composed of the capacitor C and the transmitting coil $L_{transmit}$, or a second oscillatory circuit, composed of the capacitor C and the non-transmitting coil $L_{nt}$, can now be activated. The energy is stored in the oscillatory circuit alternatingly in the capacitor C and in the transmitting coil $L_{transmit}$ or the non-transmitting coil $L_{nt}$, respectively. In the moment when the energy is stored in the capacitor C, change-over between the transmitting coil $L_{transmit}$ and the non-transmitting coil $L_{nt}$ can be made. This way, a modulation of the signal is possible without interrupting the oscillation of the oscillatory circuit. Hence, a new start-up of the oscillator circuit is unnecessary. A quick switch-off of the transmitting energy by change-over to the non-transmitting coil $L_{nt}$ is also possible.

In the tire pressure monitoring system, tire modules 6 measure tire information (e.g. tire inflation pressure, tire temperature), or characteristic tire data (e.g. size of tire, date of manufacture, useful life) is read out of a memory in the tire modules 6. The structure of the tire modules 6 comprises a transmitting/receiving unit, one or more sensors for sensing tire information, at least one data memory and an energy supply (usually a battery). The tire modules 6 receive data (for example, with a frequency of 125 kilohertz) from the associated trigger module 4. The tire modules 6 transmit at a defined frequency (e.g. the released ISM-frequencies 13.56 megahertz, 315 megahertz, 433.92 megahertz, 868 megahertz, 2.45 gigahertz) the tire information, the characteristic tire data, and an identification number (ID) or type number to the central unit 2 or the integrated central unit 7. Using a vehicle data bus (CAN), the information from the tire modules 6 can then be made available to other vehicle systems such as an anti-lock system (ABS), an electronic stability system (ESP), etc., in order to take influence on control processes depending on the received tire information. Display of the tire information to the driver is also possible, or an alarm can be output to the driver, e.g. when the tire inflation pressure falls below a critical value.

It is also possible to evaluate the date of manufacture of the tires and a current date in the vehicle (e.g. existing dashboard information synchronized by way of real time) in order to indicate to the driver or a servicing point (e.g. repair shop) that the tires are over aged.

The tire-related data stored in the tire modules 6 renders it possible to adapt defined components (e.g. ABS, ESP, steering system, etc.) of the vehicle to the tires. When improving the wet grip properties of a tire, for example, the steerability on dry roads will be impaired, above all at low speeds. If such a characteristic is stored in the tire module, the power steering system is able to compensate this drawback, unnoticed by the driver to a large extent. Consequently, negative, yet compensable, properties of the tire can be tolerated intentionally in order to improve essential characteristics of the tire.

During operation of the tire pressure monitoring system or only during an allocation process, the tire modules are triggered by way of one or more so-called universal IDs. Furthermore, it is thus possible to trigger the newly existing tire modules even in the event of wheel or tire exchange (e.g. from summer tires to winter tires or in the case of new tires).

In a tire pressure monitoring system according to the first embodiment (FIG. 1), the allocation of the tire modules 6 to the associated trigger module 4 is carried out because a trigger module, e.g. the one at the left front wheel position, is purposefully triggered by the central receiver 2 in order that this trigger module learns the tire module in its proximity. It is ensured by the short range of transmission of the trigger module that only the tire module will react to the signal of the trigger module, which is in close proximity to the trigger module. If, for example, two trigger modules are arranged at the front axle, the tire modules close to the respective trigger module can be allocated unambiguously to a wheel position. The tire modules at the rear axle are triggered by one single trigger module. At least the allocation of the two tire modules to the rear axle is hereby safeguarded. Several methods can be used for the allocation of the two tire modules to one wheel position (left rear and right rear in this case). First, an allocation can take place with the aid of a direction-of-rotation detection; or when the trigger module is arranged asymmetrically (e.g. closer to the left rear wheel) at the axle, an allocation can take place by way of an evaluation of the trigger field strength (trigger intensity) received by the tire modules. Alternatively, the trigger module can also transmit information with different trigger field strengths so that, with an asymmetric arrangement of the trigger module at the axle, only that tire module will be triggered at a low trigger field strength, which is proximate the trigger module.

A tire pressure monitoring system according to the second embodiment (FIG. 2) includes only two trigger modules, one at the front axle, one at the rear axle. In this case, the tire modules are initially allocated in an axle-related fashion, i.e. two tire modules are triggered in a first step, that is to say those ones at the axle, at which the trigger module transmitting as first is placed. Thus, two tire modules can be allocated in each case to one axle. A direction-of-rotation detection renders it possible to detect which tire module is disposed on which vehicle side. A tire module can send a telegram, e.g. upon receipt of the universal-ID, and therein report the direction of rotation. Or the tire modules are triggered by the trigger modules in a targeted manner, i.e. by the trigger telegram, depending on the direction (e.g. trigger the wheels turning left by a telegram part in the data telegram of the trigger modules or the universal-ID). Thus, all tire modules can be allocated, whereby specific triggering of the tire modules can take place in the future. A direction-of-rotation detection can be omitted in low-cost systems as well. In this case, the tire modules are allocated only to one vehicle axle respectively.

Figure 8:
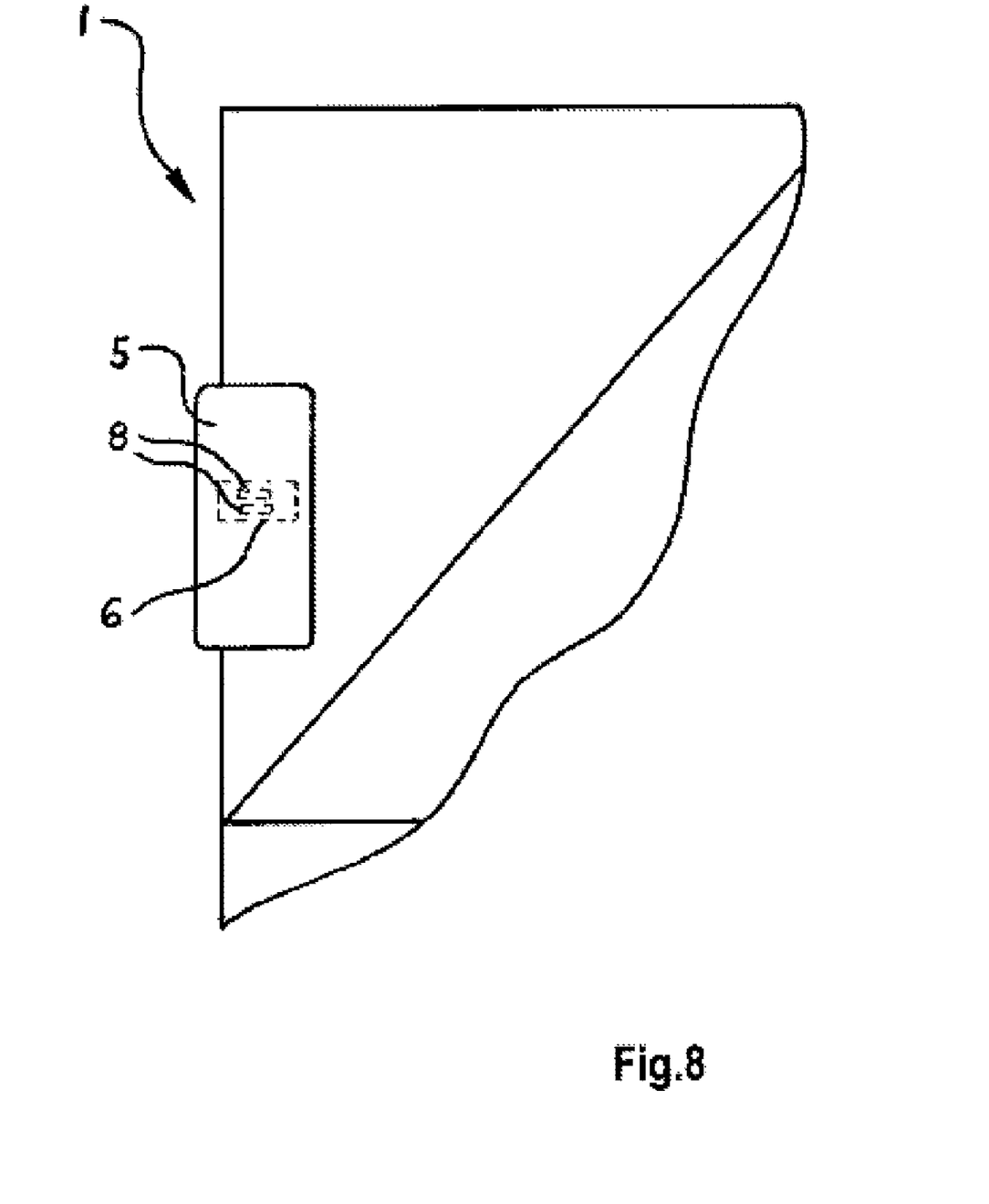
FIG. 8 shows a tire pressure monitoring system including two accelerometers.

Referring to FIG. 8, one possibility for the direction-of-rotation detection involves that the tire module includes two acceleration sensors 8, which are positioned separately of each other and which measure the acceleration in a radial direction. Due to an offset arrangement of the two acceleration sensors 8, the acceleration pulse during entry into the tire contact area or exit therefrom is also detected in an offset manner. This difference in time can be evaluated and serve as a standard of the direction of rotation.

Further available vehicle information such as the steering angle or the wheel speed information from wheel speed sensors of an anti-lock system (ABS) can also be used to allocate the tire modules to a wheel position. In this respect, the tire modules measure the duration of one or more wheel revolutions upon command of the trigger module(s). E.g. the change in acceleration upon entry into the tire contact area can be evaluated for this purpose, or a periodicity of the trigger intensity is measured by way of the wheel circumference. It is possible to allocate the tire modules to a wheel position during cornering (detected by way of steering angles), what is done by way of the evaluation of the steering angle and the rotational speeds of the wheels (wheel speed sensors of the ABS) based on the detected differences between the left and the right vehicle wheels (detected by way of the wheel speed sensors). In addition, different wheel diameters, e.g. due to differently used/worn off tires on one axle, can be calibrated by sensing the wheel revolution time when driving straight ahead (detected e.g. by way of steering angles).

The design of the third embodiment (FIG. 3) of the tire pressure monitoring system is similar to the design of the second embodiment. However, the trigger modules are arranged asymmetrically in this case. The allocation of the tire modules to the wheel positions occurs by way of a modulation of the transmitting field strength of the trigger modules or by way of a field strength measurement in the tire modules.

In the event of allocation by modulation of the transmitting field strength, initially only one tire module will react to a signal with a low field strength that is transmitted by the trigger module, namely the tire module which is in close proximity to the trigger module. This tire module can thereby be allocated to a wheel position. Subsequently, the trigger module transmits a signal with a higher transmitting field strength so that two tire modules, i.e. both tire modules on this axle, react to the signal. As a result, the second tire module on this axle is now clearly defined and can be allocated.

In the allocation by field strength measurement in the tire modules, it is evaluated in the central unit which receiving field strength prevails. The central unit considers the tire module with the maximum receiving field strength as the tire module that is arranged more closely to the trigger module, and allocation is accordingly. This allows clearly defining the other tire module of this axle as well. This allocation can be secured statistically by known evaluation methods.

In a tire pressure monitoring system according to the fourth embodiment (FIG. 4), the allocation is like in the third embodiment.

In the fifth embodiment of the tire pressure monitoring system (FIG. 5), the allocation is similar to the third embodiment, however, the allocation of the trigger module and the integrated central receiver is not performed axlewise (front axle or rear axle, respectively), instead, there is a sidewise allocation (left or right vehicle side, respectively).

In a tire pressure monitoring system according to the sixth embodiment (FIG. 6), only those tire modules will react when a low transmitting power prevails, which are proximate the integrated central unit, for example, the tire modules of the front axle. It is then possible again to allocate the tire modules to a wheel position by use of a direction-of-rotation detection. All tire modules are triggered with a higher transmitting power of the trigger module. As a result, the other two tire modules can be allocated to the other axle, i.e. the rear axle. The allocation of these two tire modules on the rear axle again takes place by way of a direction-of-rotation detection. In low-cost systems, again there is only an allocation of the tire modules to the axles, a direction-of-rotation detection does not take place.

In addition, the LF trigger intensity, i.e. the intensity of the 125-kilohertz trigger signal, can be detected in the tire module alternatively or additionally in all mentioned embodiments. The LF trigger intensity can be used in the event of cross-talk of a trigger signal from one trigger module to several tire modules in order to detect the trigger module allocated to a wheel.

Furthermore, when using less than one trigger module per wheel position, it is possible to reach or support the localization of the tire modules. In addition, there is the possibility of adapting the trigger energy to the actually required trigger energy for a reliable transmission.

In order to safeguard that only the own tire modules 6, meaning those associated with the vehicle, rather than any tire modules of other vehicles, which are e.g. close to the own vehicle, are polled, an allocation of the tire modules 6 to the vehicle takes place in the learning program. In order to reach a minimum possible energy consumption of the batteries installed in the tire modules 6, in addition, the tire pressure monitoring system assigns an individual identification number (ID) to each tire module 6, in order that in each case one tire module 6 reacts only to transmitting signals of the associated trigger module 4, when data exchange with the tire module 6 shall take place. To this end, a so-called LF-ID (Low Frequency Identifier: low-frequency identification number) is used, whereby it is ensured that the tire module adopts its operating state only in the event of a desired data exchange between the trigger module or the (integrated) central unit and the tire module. Thus, an interference, which happens to have the same frequency (e.g. 125 kilohertz), or a trigger signal of another module, for example of a vehicle passing by, will not cause the tire modules to adopt their operating state. In case wheels are mounted at a different wheel position (front left wheel, right rear wheel, right front wheel, left rear wheel), e.g. after an exchange of tires, the universal ID is used for newly learning, after the tire module which is now at a 'wrong' wheel position cannot be triggered with the ID predetermined for this wheel position, that means, a new ID is assigned to this tire module, or a new allocation takes place. Alternatively, it is also possible to poll all already known IDs (e.g. the IDs of the summer tires and the winter tires) before a new allocation takes place, if applicable.

The allocation of the tire modules to the wheel positions in embodiments that are not described herein in detail can be achieved in an obvious manner by a combination of the described allocation methods.

In addition, a tire module can be triggered by several trigger modules for the allocation of the tire modules to the wheel positions.

Information can be stored in the tire module, when this tire module is disposed for a long period in a rotating wheel (detection e.g. by way of an acceleration sensor), however, has not exchanged data with a trigger module. The objective is to avoid hereby that a tire is used in a wrong vehicle (misuse detection). Additional pieces of information about this 'misuse' can also be stored (e.g. duration, vehicle speed, etc.).

In addition, changes of the pressure alarm thresholds, i.e. beginning when the driver is informed about the fact that the tire inflation pressure is too low, can be defined for the same tire in a way related to axles and/or related to vehicle classes. Furthermore, vehicle characteristic diagrams and/or tire characteristic diagrams can be defined, which allow an allocation of even previously unknown tires (new types), with the result that they can be used appropriately.

The tire pressure monitoring system can also be used in an alarm system. To this end, at least one tire module is switched into a so-called alarm system mode, e.g. by means of a signal from the trigger module(s). By monitoring the tire pressure and/or the temperature and/or acceleration information and/or distance detection (transmitting/receiving power; the tire is dismounted, data exchange between tire module and trigger module is interrupted), the alarm system can be initiated when defined discrepancies occur or can be caused to assume an early warning mode. The early warning mode indicates to the alarm system that there might be a burglary and/or theft of the vehicle or vehicle parts. Due to this notification, the alarm system is operated in a different range of sensitivity, with the result that changes at the vehicle are detected in a more sensitive manner.

Furthermore, the tire pressure monitoring system can utilize the transmitting function of one or more tire module(s) in order to convey information in the close vicinity of the vehicle, for example, an SOS function when the vehicle has been driven into the ditch or when an airbag has been deployed, or in order to convey information e.g. to a carwash, the car registration office, or other facilities. The tire module can be designed in such a way that the transmitting power (and thus the range) is increased with certain functions (SOS).

The invention claimed is:

1. A tire pressure monitoring system for a motor vehicle, the system comprising:

a central unit (2, 7) with at least one trigger module (4), which is integrated into the central unit or connects through control lines (3) to the central unit; and at least one tire module (6) arranged in a vehicle wheel (5), with the tire module in wireless communication with the central unit and the trigger module, wherein the tire pressure monitoring system includes fewer trigger modules than tire modules, wherein each tire module includes at least one device for sensing and measuring a trigger field strength received from the trigger module(s) (4), and the tire module transmits data indicating a measured trigger field strength to the central unit (2, 7).

2. The system of claim 1, wherein there is one tire module (6) per vehicle wheel (5).

3. The system of claim 1, wherein the at least one tire module (6) comprises a device for sensing the direction of rotation of the tire.

4. The system of claim 1, wherein the at least one trigger module transmits data with a frequency in the range of roughly 20 to roughly 300 kilohertz, to a tire module, while the at least one tire module transmits data to the central unit with a frequency in the range of roughly 1 megahertz up to roughly 5 gigahertz.

5. The system of claim 1, wherein the at least one tire module (6) includes a writable data memory, in which characteristic tire data can be stored.

6. The system of claim 1, wherein the at least one trigger module (4) includes an oscillatory circuit, which is commutable via a switch (S), from a transmitting arrangement, composed of a capacitor (C) and a transmitting coil ($L_{transmit}$), to a non-transmitting arrangement, composed of the capacitor (C) and a non-transmitting coil ($L_{nt}$).

7. The system of claim 1, wherein the at least one tire module (6) carries a universal identification number, by means of which it can be triggered by the trigger module(s) (4) in a wheel position allocation process, and with the at least one tire module includes a data memory, in which after the allocation of the tire module to a wheel position, an individual identification number is stored, by means of which the tire module is triggered by the trigger module(s) in the future.

8. The system of claim 1, wherein the at least one trigger module (4) comprises a single trigger module (4) that is in communication with at least two tire modules (6) of the system.

9. The system of claim 1, wherein the at least one trigger module (4) comprises a single trigger module (4) that is in communication with at least three tire modules (6) of the system.

10. The system of claim 1, wherein the at least one trigger module (4) comprises a single trigger module (4) that is in communication with all tire modules (6) of the system.

11. The system of claim 10, wherein the single trigger module (4) is disposed at different distances with respect to each of the tire modules (6) of the system.

12. The system of claim 11, wherein each of the tire modules (6) of the system receives a signal from the single trigger module (4) that has a different signal strength.

13. The system of claim 1, wherein the central unit (2, 7) is integrated with the at least one trigger module (4).

14. The system of claim 13, wherein the integrated central unit (2, 7) and at least one trigger module (4) is disposed closer to a front axle of the motor vehicle than a rear axle of the motor vehicle and is further disposed closer to one side of the motor vehicle than an opposing side of the motor vehicle.

15. The system of claim 1, wherein the at least one tire module comprises two acceleration sensors, the acceleration sensors being offset with respect to one another so as to detect acceleration pulse at different times.

16. The system of claim 1, wherein the at least one trigger module (6) transmits a low field strength signal and a high field strength signal.

17. A method for allocating of tire modules in a tire pressure monitoring system in motor vehicles, with the tire pressure monitoring system including a central unit (2, 7) with at least one trigger module (4), which is integrated into the central unit or connects through control lines (3) to the central unit, and respectively one tire module (6) per vehicle wheel (5), the method comprising:

having a tire module wirelessly communicate with a central unit and a trigger module, wherein the trigger module is in communication with more than one tire module in a wireless fashion; and allocating a tire module based on a field strength analysis of the data that indicates a trigger field strength received and measured by the tire modules.

18. The method of claim 17, wherein the tire pressure monitoring system includes a single trigger module that is in communication with all of the tire modules of the tire pressure monitoring system.

19. The method of claim 18, wherein the single trigger module (4) is disposed at different distances with respect to each of the tire modules (6).

20. The method of claim 17, wherein the central unit (2, 7) is integrated with the at least one trigger module (4), the integrated central unit (2, 7) and at least one trigger module (4) is disposed closer to a front axle of a motor vehicle than a rear axle of the motor vehicle and is further disposed closer to one side of the motor vehicle than an opposing side of the motor vehicle.

* * * * *